United States Patent
Cadle et al.

(10) Patent No.: US 6,419,876 B1
(45) Date of Patent: Jul. 16, 2002

(54) MACHINABILITY OF POWDER METAL COMPONENTS

(75) Inventors: Terry M. Cadle, Wauwatosa; Carl J. Landgraf, Waukesha; Joel H. Mandel, Hartford, all of WI (US)

(73) Assignee: Zenith Sintered Products, Inc., Germantown, WI (US)

( * ) Notice: Subject to any disclaimer, the term of this patent is extended or adjusted under 35 U.S.C. 154(b) by 0 days.

(21) Appl. No.: 09/575,321

(22) Filed: May 19, 2000

Related U.S. Application Data

(60) Provisional application No. 60/135,218, filed on May 21, 1999.

(51) Int. Cl.⁷ ................................................ B22F 3/24
(52) U.S. Cl. .............................. 419/26; 419/27; 419/2; 425/78
(58) Field of Search ................................ 419/2, 26, 27

(56) References Cited

U.S. PATENT DOCUMENTS

| | | | | |
|---|---|---|---|---|
| 2,788,324 A | * | 4/1957 | Mitchell | 252/12.2 |
| 2,849,324 A | * | 8/1958 | Cox | 106/10 |
| 3,413,393 A | * | 11/1968 | Turk | 264/111 |
| 3,528,789 A | * | 9/1970 | Mathewson, Jr. | 51/295 |
| 3,689,964 A | * | 9/1972 | Reen | 29/420.5 |
| 3,833,346 A | * | 9/1974 | Wirth | 51/306 |
| 4,239,501 A | * | 12/1980 | Wirth | 51/281 R |
| 4,357,249 A | * | 11/1982 | Mellor | 252/12 |
| 5,164,256 A | * | 11/1992 | Sato et al. | 428/304.4 |
| 5,217,814 A | * | 6/1993 | Kawakami et al. | 428/545 |
| 5,762,423 A | * | 6/1998 | Mori et al. | 384/279 |
| 5,967,110 A | * | 10/1999 | Tsutsui et al. | 123/195 HC |
| 6,105,250 A | * | 8/2000 | Tanaka et al. | 29/898.02 |
| 6,206,983 B1 | * | 3/2001 | DeArdo et al. | 148/332 |

OTHER PUBLICATIONS

ASM Handbook, vol. 7, Powder Metallurgy, pp. 551–565, Jun. 1984.*

* cited by examiner

Primary Examiner—Daniel J. Jenkins
(74) Attorney, Agent, or Firm—Quarles & Brady LLP

(57) ABSTRACT

A sintered powder metal part is prepared for machining by injecting grease into the surface of the part to be machined to a depth at least equal to the depth of machining. The grease is injected under very high pressure using repressing tooling by applying a certain volume of grease between the surface to be machined and the mating tool surface and applying pressure sufficient to uniformly inject the grease into the surface. A rim may be formed in the part adjacent to the surface which acts as a seal during grease injection and is compressed into the part.

7 Claims, 3 Drawing Sheets

MACHINABILITY OF POWDER METAL COMPONENTS

CROSS-REFERENCE TO RELATED APPLICATIONS

This claims the benefit of U.S. Provisional Patent Application No. 60/135,218 filed May 21, 1999.

STATEMENT REGARDING FEDERALLY SPONSORED RESEARCH OR DEVELOPMENT

Not Applicable.

FIELD OF THE INVENTION

This invention relates to powder metallurgy, and in particular to improving the machinability of sintered powder metal components by injecting into the component a layer of grease which penetrates the surface of the component to a given depth.

BACKGROUND OF THE INVENTION

In large quantity manufacture of components made by powder metallurgy (P/M), there is often a need to improve the shape or increase the precision of a dimension by localized machining operations. Steel products made by P/M are usually harder to machine than their traditional steel or cast iron equivalents. This is thought by many in this field to be due to the presence of interconnected microporosity that produces micro vibrations at the cutting tool edge as it jumps across the pores.

There are several well-known and published ways to improve the ease of machining (machinability) of powder metal parts, but the methods are generally expensive. Included in the well-known methods is the addition, to the P/M steel powder blend prior to compaction, of machinability aides also in powder form, such as manganese sulfide or calcium fluoride. Other well known methods include: filling of the micro-pores of the P/M steel matrix with an anaerobic plastic resin, or fully impregnating the pores with oil containing machining enhancement additives. All of these options treat the whole body of the component, whereas in fact, only a shallow surface region actually needs the machining enhancement. Therefore, these methods are wasteful and costly.

An alternative approach is to change the chemical composition of the surface region to be machined, for example by reducing the P/M steel carbon content. This local decarburization involves additional thermal or chemical processing, which adds to the cost. In addition, it is well known that surface decarburization is harmful to P/M steel strength under cyclic fatigue stress conditions.

In a particular case, namely piston-combustion-engine main bearing caps, all of the above measures have been tried with varying degrees of success in order to improve the machinability of the P/M steel.

The main bearing caps are arch-shaped, each having a half-bore which is machined to accept a crankshaft bearing, shell, and functions to locate and retain the crankshaft in its position below the cylinder block of a combustion engine. The main bearing cap must withstand the full force of the engine power as the combustion power is transferred from linear to rotational motion via the crankshaft. To provide a very round bore so as to ensure a smooth and quiet running engine, it is necessary to carry out a machining operation called line-boring. This involves simultaneously boring precision holes in the assembly of the cylinder block and bearing caps in order to provide a seating for the bearing shells that in turn contain the crankshaft. The cylinder block is usually made from cast iron or from an aluminum alloy. Therefore the boring operation is cutting two semi-circles, one in the cylinder block and one in each main bearing cap, in dissimilar materials simultaneously (either aluminum alloy and P/M steel or cast iron and P/M steel). This is commonly known as bi-metallic machining. Since the machining parameters, which include cutting, speed, feed rate, and depth of cut, are usually optimized to a single material bi-metallic machining often demands a compromise in cutting conditions selected. Since the smaller and cheaper component of the two being machined is the P/M steel main bearing cap, this is usually the focus of attention regarding improvement of machinability.

Experimentation has determined that local surface impregnation of a P/M steel bearing cap with oil containing solid lubricant additives produces a significant improvement in cutting tool life. This improvement was evaluated by setting-up a simulation of an engine producer's block-line. P/M steel bearing caps were bolted to either aluminum casings or cast iron castings, which represent the respective cylinder block. The number of standard "cuts" that could be achieved before the cutting tool failed (it either wore excessively or lost its cutting edge by chipping) was measured. It was found that local impregnation with oil increased tool life by 200% to 300% in these tests.

It was surprising, however, that this success was not repeated when the same components were sent to a car engine manufacturer to be machined on the block-line at their facility. An intense investigation finally gave an answer to this apparent anomaly. It was round that freshly oil-impregnated surfaces provided lubrication and cooling of the cutting insert during in-house tests, but, after a period of time in transit and in storage before machine testing at the engine block-line, the oil layer soaked away into the body of the bearing cap, leaving very little behind to aid machinability. The mechanism of soaking away is known as capillary attraction and is based upon well-known physical laws governing fluid surface tension and diameters of holes (micro-pores).

This discovery prompted a research and development program to find a localized impregnant that would not soak away, but would "stay put". After trying many different approaches, it was concluded that if the oil can be made to impregnate the P/M steel micro-pores under conventional impregnating conditions (normally a vacuum), then it would not "stay put" over a potential transit and storable period of one to six months. It appears that the readiness to impregnate is mirrored in the tendency to migrate away from the surface layer.

A potential though costly solution is conventional full oil impregnation. A method to achieve this is to place the P/M steel components in a steel basket, which is lowered into and sealed into a vacuum chamber. A vacuum is drawn, which pulls the air out of the inter-connected micro-pores in the P/M steel leaving a vacuum behind. Oil is caused to be sucked into the chamber by the vacuum such that the parts become immersed. The vacuum is released and atmospheric air pressure enters the chamber and pushes the oil into the evacuated micro-pores thereby filling them. This is a slow process with a cycle time of 30 minutes to an hour, and since P/M bearing caps can weigh 2 to 4 lbs. each, productivity is slow and the process is costly. Also, since the entire part is filled with oil and there is about 14% of micro-porosity present by volume, the oil usage is substantial and therefore also costly.

A further drawback to using oil impregnant is the limited amount of solid lubricant additives in the form of special compounds that can be added to the oil. Such compounds as manganese sulfide, molybdenum disulfide, or elemental graphite are beneficial to tool life, but they limit the fluidity of the oil and also tend to segregate and settle-out during storage prior to processing. This requires constant oil agitation and even then there is a tendency to segregation leading to inconsistent composition. It would be ideal if more solid machining aid compounds could be added to the oil, held in suspension, and yet still impregnate the P/M steel under commercial vacuum conditions. This desirable combination was not possible to achieve in experimentation due to conflicting requirements.

SUMMARY OF THE INVENTION

The invention provides a sintered powder metal part which is prepared for having a surface machined by having a layer of grease injected into its surface. The grease does not leak or wick away from the surface and stays put to increase tool life during machining.

Preferably, the grease is injected to a depth which is at least equal to the depth of machining, to fully utilize the advantages of the invention.

In another aspect of the invention, the part may be formed with one or more ribs adjacent to the grease injected surface which have been compressed down into the parts. Prior to compressing or collapsing them into the part, the ribs act as seals during the injection process to keep grease from leaking out between the pressing tool clearances, away from the surface to be treated.

The invention also provides a method and apparatus for preparing a part incorporating the above features.

These and other objects and advantages of the invention will be apparent from the detailed description and drawings.

DESCRIPTION OF THE INVENTION

This invention teaches a new approach to improvement of the machinability of a P/M steel component, such as a main bearings cap, by a localized in-process treatment of low cost and high effectiveness.

According to the invention, a shallow surface layer of the P/M steel is impregnated with a "grease" rather than with oil. Grease can be thought of as a sponge filled with oil. Grease can be very viscous and will not soak away by capillary attraction, but instead "stays put". A challenge was how to locally impregnate grease since conventional vacuum impregnation was found to be ineffectual. Several attempts to melt and soften the grease prior to impregnation were unsuccessful since the "sponge" part of the grease resists becoming fluid.

Figure 1A:
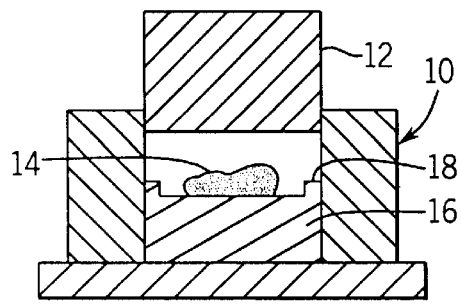
FIGS. 1a–1c illustrate a sectional view of a die containing a sintered disc in which grease is being injected into the top surface of the disc.
Figure 1B:
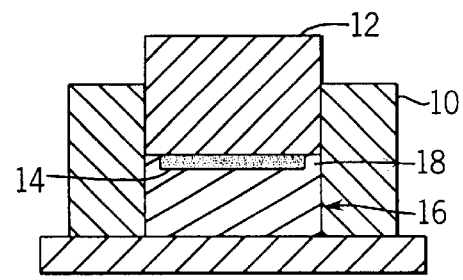

The answer was discovered in very high pressure injection. An early experiment is illustrated in FIG. 1. This shows a cylindrical tool set (FIG. 1a) consisting of an annular die 10, a cylindrical compression punch 12 and a carefully metered blob of grease 14. The test piece is a compacted and sintered P/M steel disc 16. The disc 16 has an integral raised annular rim 18 all of the way around the perimeter of its top surface, the rim 18 having been molded-in during compaction, prior to sintering of the disc 16. This rim was made 0.010" high and 0.050" thick radially. The height of the rim was calculated from the fact that there is about 1 part in 6 of connected micro-porosity in the P/M steel and so to achieve the target impregnation depth of 0.060" a thickness of grease of 0.010" would be needed.

As the compression punch 12 is lowered into the die cavity, (FIG. 1b) it spreads and squeezes the grease outwards to trap a film 0.010" deep over the surface area of the disc 16 within the rim 18. As pressure is applied to the punch, the raised rim acts as a seal and prevents the grease from squirting out of the gaps between the tool elements. As the load is increased via a hydraulic press, the rim gradually collapses into the body of the disc to create a zone which is more dense than the adjacent surfaces, and it is shown fully compressed into the body in FIG. 1c. This is only possible with a material that is not fully dense, for example, P/M steel. It is important to note that conventional solid materials like steel or cast iron are incompressible, so a raised rim could not compress into the body of the part.

Figure 1C:
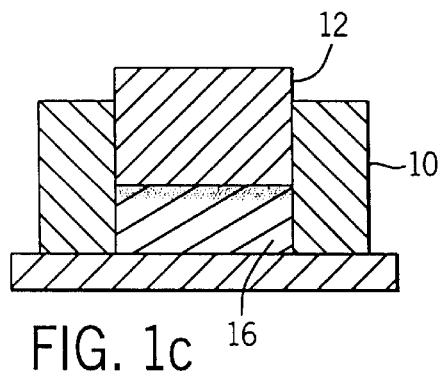

As the P/M steel rim collapses, the trapped grease is injected into the surface micro-pores of the P/M steel (FIG. 1c). Experimentation found the rim to be totally flattened out at about 30 tons load. Then the P/M disc was removed from the die and inspected. There was a smearing of grease observed on the greased surface, but virtually no leakage outside the rim 18.

Figure 2:
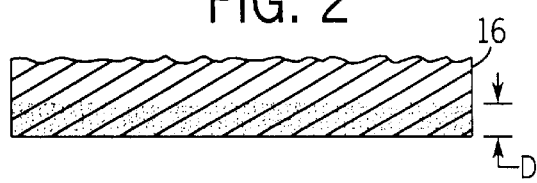
FIG. 2 is a fragmentary view of the disc of FIG. 1 fractured and showing the depth of crease penetration.

Next, the disc was fractured on a hydraulic press using a three point bending fixture. The fracture was examined (FIG. 2) and it was clear by the appearance that the grease had penetrated to a depth D of about 0.060" very uniformly. This depth is also appropriate for the bearing cap application since about 0.040" of depth is removed by the engine-maker when the cap is line-bored. The extra 0.020" provides a good safety margin.

Encouraged by this success, preliminary feasibility tests were carried out on actual P/M steel bearing caps in current production. Tests were carried out without molding a rim onto the bearing cap tooling since cost and time for this modification would cause an excessive delay. Therefore, a simple test was devised to prove the concept.

Figure 3:
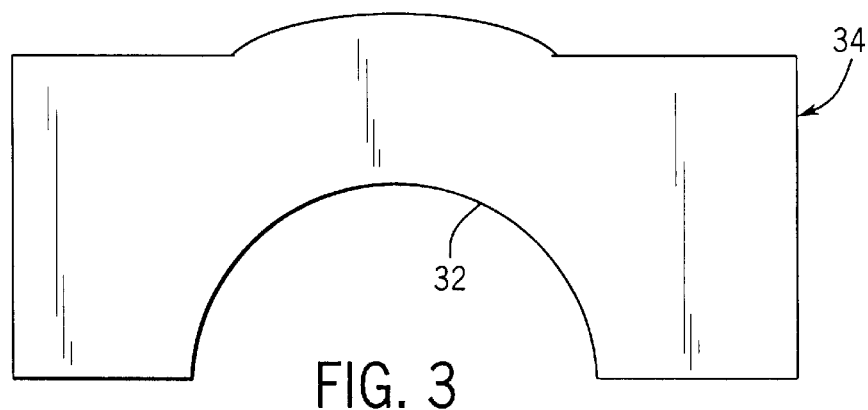
FIG. 3 is side elevation view of a main bearing cap.
Figure 4:
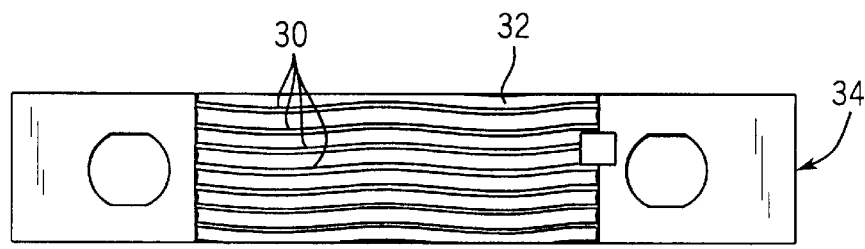
FIG. 4 is a bottom elevation view of the main bearing cap of FIG. 3 with lines of grease applied to its half bore.
Figure 8:
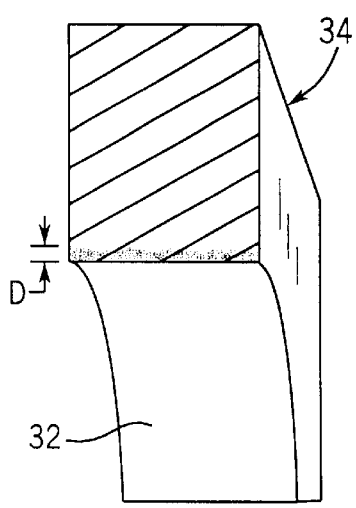
FIG. 8 is a cross-sectional view through a main bearing cap showing the depth of surface impregnation of the grease in the half bore surface.
Figure 5:
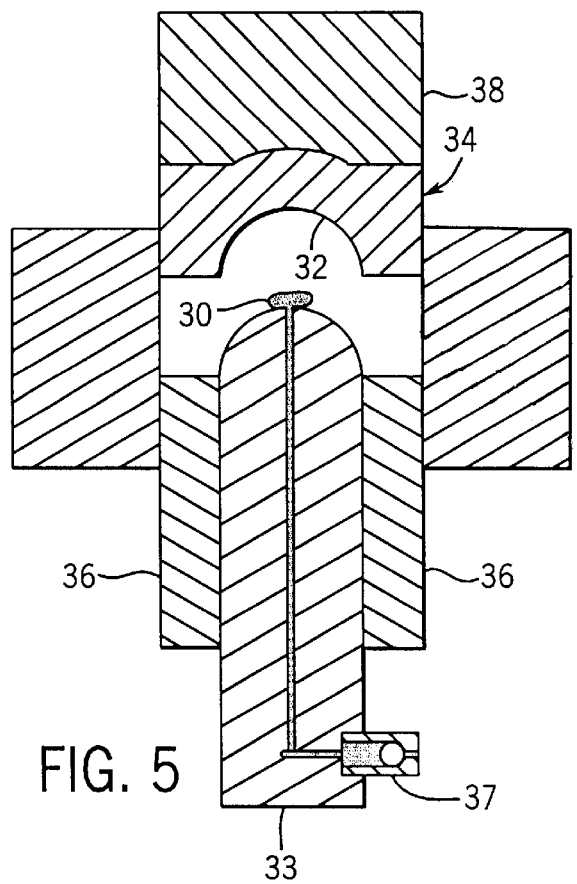
FIG. 5 illustrates another die in section in which grease has been introduced through passageways in the punch, this die being for injecting grease in the half-cylinder bore surface of a main bearing cap.
Figure 6:
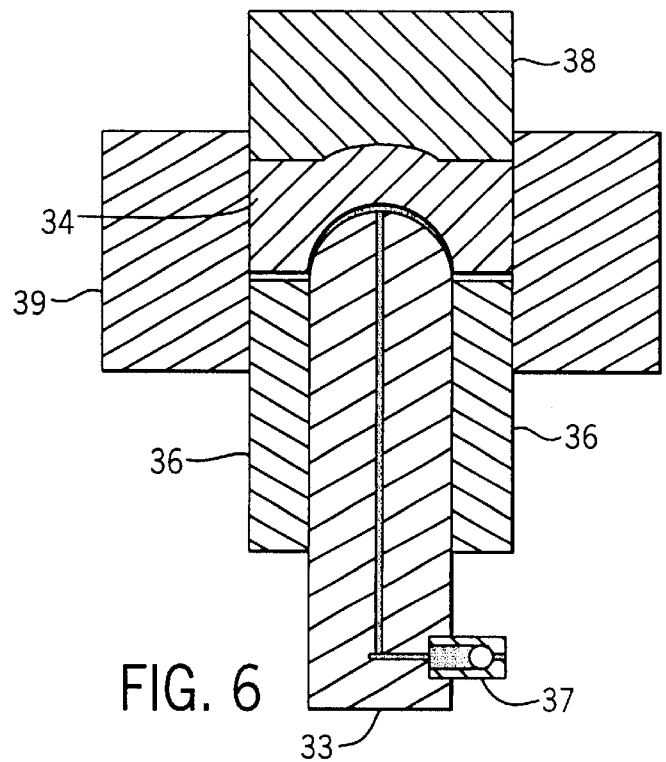
FIG. 6 is a view similar to FIG. 5, but at a stage of compression in which the grease is spread over the half bore surface of the bearing cap.
Figure 7:
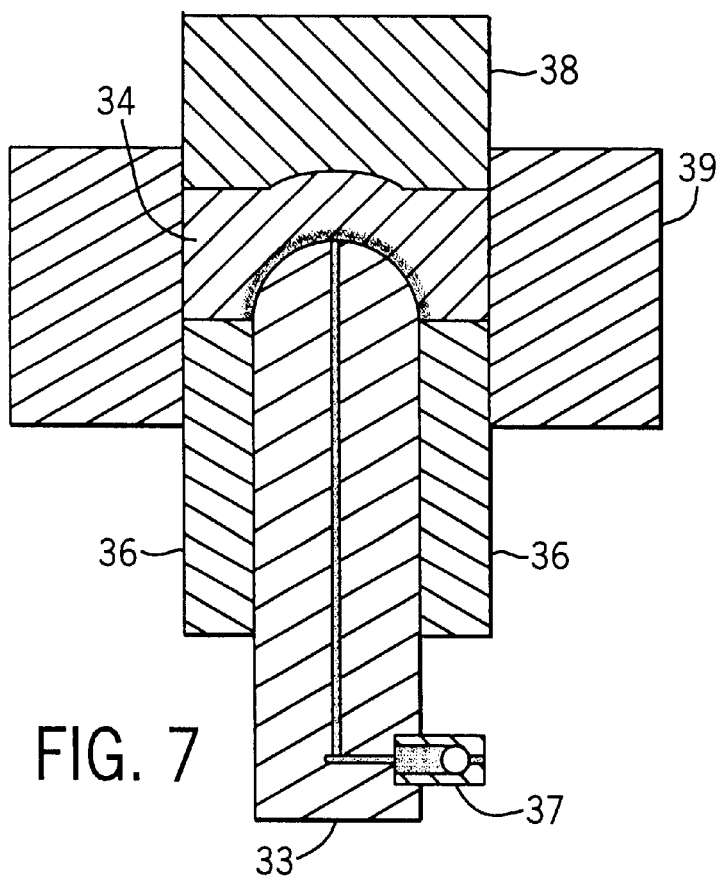
FIG. 7 is a view similar to FIG. 6, but in which the punch has moved closer to the half bore surface so as to inject the grease into the half bore surface.

A fine triangular-toothed plastic comb (not shown) was utilized to lay down parallel beads of grease 30 on the half bore surface 32 of the bearing cap 34 (FIGS. 3 and 4). The size of the beads 30 and the spacing was designed to deposit a total volume of grease on the surface to be impregnated to give the same depth of penetration as was obtained in the disc experiment. The P/M steel cap 34 was then processed through the standard production step known as sizing, (also known in the industry as coining, repressing or calibration). This involves taking the previously compacted and sintered component and re-pressing, it in a second set of fully enclosed tools (FIGS. 5–7), which includes an arch punch 33, leg punches 36, upper punch 38 and die 39, to improve the dimensional quality and improve shape accuracy. The act of sizing a typical bearing cap applies over 150 tons load, which is more than enough to inject the grease into the bore surface which has a projected area of about 2.5 square inches. This gives an enormous pressure of about 75 tons per sq. in. After the greased caps were sized, they were fractured to observe the depth of grease penetration, which was found to be fairly uniform at an average depth D of about 0.070" as shown in FIG. 8.

Work is continuing to develop a method for delivering the grease dose in production. The method favored to date involves introducing a blob of grease 30 (FIGS. 5–7) through the arch punch 32 of the sizing tools with a pressurized and metered grease gun (not shown) that is triggered every time the press cycles. Such auto-grease guns are commercially available for special machinery lubrication. The grease gull features a non-return valve 37 to ensure grease does not back up into the feed tube when pressure is applied by the tooling.

Figure 9:
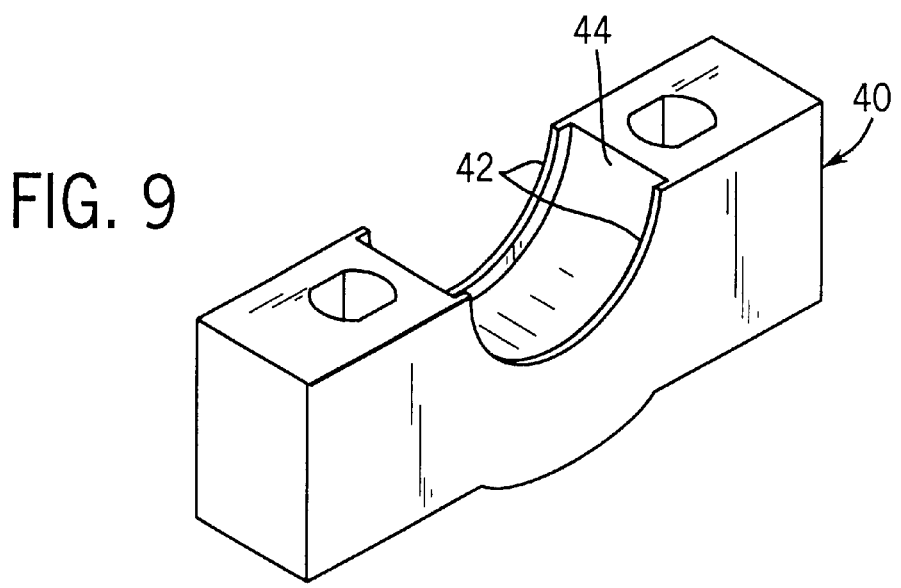
FIG. 9 is a view of a main bearing cap formed with squashable side ribs to help contain the grease on the half bore surface as it is being injected.

A rim may be added to the bearing cap when compacting it, prior to sintering, by modifying a compaction arch punch to provide a trapped volume for the grease and also a rim seal to avoid excessive grease escape into the other areas of the tooling. A three-dimensional rendition of the shape of a cap 40 with molded rim ribs 42 along the sides of the surface 44 is shown in FIG. 9. As in the case of the disc, the very high pressure applied during the sizing operation (FIGS. 5–7) injects the trapped grease into the surface 44 of the bearing cap 40 half bore.

Regarding the grease composition, it is proposed to use a variety of formulations according to the specific machining conditions used by the engine manufacturer. This includes greases containing graphite or molybdenum disulfide or lithium compounds. The exact formulation may be determined by line-bore simulation tests. In the above described trials, Mobilgrease® Special Multipurpose Automotive Grease available from Mobil Oil Corporation, which is an NLGI No. 2, unleaded, molybdenum disulfide fortified, extreme pressure, lithium complex soap base grease, was used. The depth of impregnated grease will typically be about 1 to 4 mm (0.040) to 0.160 inches).

Thus the invention provides a method and apparatus for, and the resulting product of, a process that injects grease into a surface layer of a sintered powder metal component under very high pressure. The injection pressure is preferably applied during an operation step known in the powder metallurgy industry as sizing or repressing or coining or calibration, thereby capitalizing on the very high, pressures of about 30 to 100 tons per square inch which are generally used in this process step. The use of a metered amount of grease, applied to the gap between the P/M surface to be impregnated and the repressing tools, results in a depth of grease penetration appropriate for the depth of metal removal in subsequent machining operations.

This process may be used in conjunction with a molded-in powder metal product design-feature that consists of a thin narrow rim of raised material around the periphery of the area to be impregnated by grease. During collapse of the rim in the repressing action, this rim acts to seal in the grease, which results in the grease being injected into the surface micro-pores of the powder metal component and restricts leakage through the repressing tool clearances.

The grease composition is selected to confer specific properties on the injected surface such as enhanced machinability, involving compounds such as molybdenum disulfide, lithium compounds or elemental graphite which are incorporated into the grease.

In accordance with the invention, the amount of grease is metered and injected into the gap between the powder metal sintered compact and the corresponding sizing tooling punch. The injection may be through a hole (or holes) in a repressing tooling punch that connects an accessible external location to the surface which mates with the powder metal part surface that is to be impregnated with grease.

The grease composition is chosen to confer improved machinability in the form of extended tool-life when machining a powder metal product such as a bearing cap, and may contain one or more machinability aides that include but are not restricted to molybdenum disulfide, graphite, lithium, manganese disulfide and calcium fluoride. The depth of penetration of crease is controlled to match the depth of metal removal from subsequent machining with an allowance for normal process variations.

It is possible that injected materials other than grease may be used in the invention. Perhaps any semi-plastic fluid, i.e., paste-like, material could be used, that stays put after it is injected. Similar or other benefits may be obtained, for example, from injecting such other materials, which may be lubricating or not. Examples of paste-like materials are too numerous to list, but include paste adhesives and fillers which may cure after injection, and other materials which may not cure but which do not flow away from the surface after injection.

Preferred embodiments of the invention have been described in considerable detail. Many modifications and variations to the embodiments described will be apparent to persons of ordinary skill in the art. Therefore, the invention should not be limited to the embodiments described, but should be defined by the claims which follow.

We claim:

1. A method of preparing a sintered powder metal part to have a part surface thereof machined, said method comprising:

placing said part in a set of pressing tooling having a punch with a punch surface which is sized and shaped to mate with and compress said part surface upon the application of pressure to said tooling;

placing a volume of grease between said part surface and said punch surface; and compressing said part in said tooling to compress said grease between said part surface and said punch surface at a magnitude sufficient to inject said grease into said part surface prior to machining said part surface.

2. The method of claim 1, wherein said grease is injected into said part surface to at least the depth said surface is to be machined.

3. The method of claim 1, wherein said part is formed with a raised rim adjacent to said part surface, and said raised rim forms a seal against grease leakage during said compressing step.

4. The method of claim 3, wherein said raised rim is compressed into said part during said compressing step.

5. The method of claim 1, wherein said part is a bearing cap and said part surface is a half bore surface of said bearing cap.

6. An apparatus for preparing a surface of a sintered powder metal part for machining, said apparatus comprising:

a set of pressing tooling including a punch with a punch surface which is sized and shaped to mate with and compress said part surface upon the application of pressure to said tooling;

a grease applicator for placing a volume of grease between said part surface and said punch surface; and means for applying pressure to said part in said tooling to compress said grease between said part surface and said punch surface at a pressure magnitude sufficient to inject said grease into said part surface prior to machining said surface.

7. The apparatus of claim 6, wherein said volume of grease and pressure are sufficient to inject said grease into said part surface to a depth which is at least equal to the depth of machining of said surface.

* * * * *

UNITED STATES PATENT AND TRADEMARK OFFICE
CERTIFICATE OF CORRECTION

PATENT NO.     : 6,419,876 B1
DATED          : July 16, 2002
INVENTOR(S)    : Cadle et al.

It is certified that error appears in the above-identified patent and that said Letters Patent is hereby corrected as shown below:

Title page,
Item [54], "MACHINABILITY OF POWDER METAL COMPONENTS" should be -- IMPROVED MACHINABILITY OF POWDER METAL COMPONENTS --.

Column 1,
Line 38, "filling," should be -- filling --.
Line 58, "bearing," should be -- bearing --.

Column 2,
Line 4, "Therefore" should be -- Therefore, --.
Line 9, "cutting," should be -- cutting --.
Line 11, "material" should be -- material, --.
Line 32, "round" should be -- found --.
Line 48, "storable" should be -- storage --.

Column 3,
Line 43, "crease" should be -- grease --.

Column 4,
Line 1, "bearings" should be -- bearing --.

Column 5,
Line 3, "sizing," should be -- sizing --.
Line 6, "re-pressing," should be -- re-pressing --.
Line 25, "gull" should be -- gun --.
Line 50, "(0.040) to" should be -- (0.040 to --.
Line 57, "high," should be -- high --.

UNITED STATES PATENT AND TRADEMARK OFFICE
CERTIFICATE OF CORRECTION

PATENT NO. : 6,419,876 B1
DATED : July 16, 2002
INVENTOR(S) : Cadle et al.

It is certified that error appears in the above-identified patent and that said Letters Patent is hereby corrected as shown below:

Column 6,
Line 26, "crease" should be -- grease --.

Signed and Sealed this

Twenty-first Day of January, 2003

JAMES E. ROGAN
*Director of the United States Patent and Trademark Office*